Sept. 25, 1951   C. L. ALTENBURGER   2,569,215
OPEN-HEARTH PROCESS
Filed Nov. 9, 1946
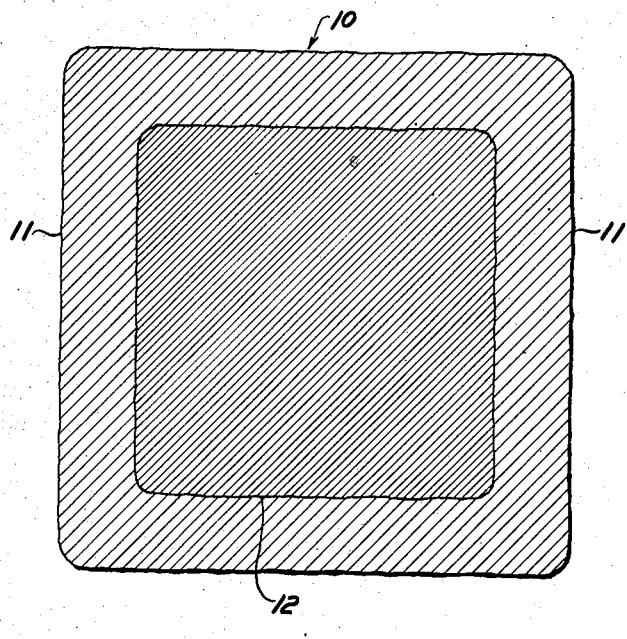
INVENTOR.
CLARENCE L. ALTENBURGER.
BY
ATTORNEY.

Patented Sept. 25, 1951

2,569,215

UNITED STATES PATENT OFFICE 2,569,215

OPEN-HEARTH PROCESS

Clarence L. Altenburger, Dearborn, Mich., assignor to National Steel Corporation, a corporation of Delaware Application November 9, 1946, Serial No. 709,005

3 Claims. (Cl. 75—56)

This invention is primarily concerned with effecting economies and improvements both in the operation and production of and in the charge for open hearth furnaces when these furnaces are operated in accordance with the high hot metal process.

Hot molten metal, molten pig iron, is often used as part of the basic open hearth furnace charge. In the low metal or high scrap metal process of charging open hearth furnaces, the scrap and limestone are first charged and heated and then the molten pig iron is added. The heat is then purified and worked so that the molten metal bath will contain the desired quantities of various constituents. No slag is flushed from the furnace upon the addition of the hot metal and usually no iron oxide bearing material, such as iron ore or sinter, is charged before adding the molten metal. The amount of molten pig iron usually constitutes about 45%, or less, of the total iron charged into the furnace. This scrap metal process is used primarily when scrap is relatively abundant.

At present scrap is relatively expensive and scarce. For this and other reasons, it is often desirable to follow the high hot metal process of charging the open hearth furnace. In this process the relatively small amount of scrap, if any scrap is used, and the limestone are charged into the furnace. A layer of iron oxide, iron ore, or other iron oxide material, is then placed in the furnace above the limestone. The oil or gas burners, or other sources of furnace heat, are then turned on or turned up and after these charged materials have become thoroughly heated, molten pig iron is poured into the furnace. The silicon in the molten metal is almost immediately oxidized to silica which forms a slag of such temperature and viscosity that it foams. This foaming slag is usually permitted to flow out through a hole prepared for that purpose in the back of the furnace. After the slag has been flushed, the heat is purified and worked as desired. The amount of charged molten pig iron constitutes about 50% to 80% by weight of the total iron charge. The high hot metal process primarily differs from the low hot metal process in that a substantial quantity of ore is charged prior to the addition of molten pig iron, more molten pig iron is charged into the furnace and slag is removed before the heat is purified and worked. The high hot metal process is used primarily when the supply of scrap is relatively short and there is a relatively abundant supply of molten pig iron available. Those integrated steel plants, which include both blast furnaces and open hearth furnaces situated close enough together so as to make it feasible to transport the molten metal from the blast furnace to the open hearth furnace, are often able to use the high hot metal process to advantage.

The relatively large layer of ore, mill scale, sinter or other iron oxide material, which is charged into the furnace in the high hot metal process, requires a considerable amount of heat to raise its temperature sufficiently to permit charging of the molten pig iron and also is a relatively good heat insulator with the result that a relatively long, initial heating period is required before the heat soaks through the ore and before the hot metal can be added to the charge in the furnace. This in turn tends to increase the time required to produce a heat and lower the production rate of the open hearth furnace. The capital investment in open hearth furnaces and the attendant apparatus is quite high so that effecting even a small increase in the time required to produce a heat materially increases production costs per ton of steel. Furthermore, iron ore suitable for charging in such amounts is relatively scarce and at times not available at a cost which makes the process economical.

It is an object of this invention to provide a charge for and a method of charging an open hearth furnace when the high hot metal process is being practiced that will effect improvements and economies in the process.

Another important object of the present invention is to reduce the time heretofore required to heat the charge when practicing the high hot metal process and thereby increase the production rate of basic open hearth furnaces and decrease the costs per ton of steel produced.

A further object of the present invention is to increase the range of types or kinds of iron ore and other iron oxide materials which can be used in the high hot metal process.

Another object of the present invention is to provide a novel briquette that can be readily charged into an open hearth furnace and that will tend to become more quickly sufficiently heated so that the relatively large amount of hot metal can be added in less time.

The present invention provides as part of the charge and in place of the usual layer of iron ore, or other non-reduced iron oxide material, a plurality of briquettes of partly reduced iron ore, each briquette having an outer layer of readily oxidizable sponge iron and a core of iron oxide. When the heat is applied to these briquettes under oxidizing conditions, the porous iron quickly oxidizes and the briquettes including their non-reduced portions are relatively rapidly heated. This heating of the mixture is aided in two ways. First, upon being heated, the porous iron generates additional heat as a result of its exothermic oxidation reaction which materially aids in heating the mass and in reducing the heating period. Second, the oxidizable iron portions are less efficient heat insulators than ore and they also break the continuity of the iron oxide so that the heat more readily soaks through this part of the charge. This exothermic heat is appreciable as each ton of metallic iron oxidized to ferric oxide generates about 6,350,000 B. t. u. Consequently, less heating time is lost before the molten pig iron can be added to the open hearth furnace. Reducing this heating period by even a small amount will result in substantial savings in that both the capital charges and the fuel costs are reduced. In addition and especially when using the novel partly reducing briquettes, poorer grades of iron ore can be used which at times is an important economical consideration and the troubles and hazards encountered when using ores which contain an excessive amount of fines are eliminated.

The accompanying drawing is a somewhat schematic showing of a transverse, sectional view of a novel, ferrous metal briquette of partially reduced iron oxide embodying the features of the present invention. This briquette 10 is produced from iron ore and includes an outer layer 11 essentially consisting of oxidizable metallic iron and a core 12 of iron oxide. The oxygen content of the iron oxide core will depend upon the type of iron ore or iron oxide material from which the briquette is made and also will depend upon the amount of iron which is reduced to metallic iron. The more iron which is reduced to metallic form in outer layer 11, the lower the oxygen content will tend to be of the iron oxide core 12. The following illustrative analysis of briquettes of the type shown in the accompanying drawing is for the purposes of illustration. In this illustrated briquette, about 50% of the total iron has been reduced to metallic iron. Adjacent the outer surface, the briquette contains about 81% metallic iron, about 6.6% iron oxide calculated as FeO, and about 12% gangue, including silica, carbon, lime, etc.

The semi-sponge iron briquette may be produced in any desirable manner. For example, the briquette may be produced by any one of the methods followed in producing sponge iron briquettes except that the heating and reduction of the iron oxide must be stopped before total reduction is effected. United States Patent No. 2,386,073 to J. H. Stewart discloses a method of producing sponge iron briquettes. The iron oxide, which may be iron ore, mill scale or mixtures thereof, may be mixed with carbon in the form of finely divided coal and binder, if necessary, briquetted in a press, and then placed in saggers or other containers. The filled saggers are heated in a kiln or other suitable means sufficiently to cause the carbon to reduce the iron oxide to metallic iron without melting the ferrous material to form, which is commonly known as sponge iron. The heating of the briquette is interrupted before complete reduction of the iron oxide. Alternatively, the iron may be mixed with binder, if necessary, briquetted in a press, and then covered with carbonaceous material and heated to reduce part of the oxide to sponge iron. The iron ore briquette can be partially reduced by heating it in a reducing atmosphere. The exact degree of purity of the sponge iron is not as important as the result that there should be sufficient readily oxidizable metallic iron present to aid in heating the iron oxide core.

The briquettes of partially reduced iron oxide may be made from other iron oxide material and should contain about at least 5% and preferably not more than about 60% of the total iron as metallic iron. If there is less than 5% metallic iron present, there is no appreciable effect and if there is more than 60% metallic iron present, the cost is unduly increased although a higher percentage of metallic iron does not render the briquettes inoperative.

The following charge is for purposes of illustrating my invention:

151,000 lbs. of scrap
62,000 lbs. of briquettes
35,000 lbs. of limestone
315,000 lbs. of molten pig iron These partially reduced iron ore briquettes had the analysis previously set forth. The primary charge of scrap, limestone and briquettes heated more rapidly than a similar charge containing iron ore in place of the briquettes. After the initial charge was heated and the metallic iron in the briquettes converted to iron oxide, the molten pig iron was added and the slag then flushed from the furnace in the usual manner. The slag had good fluidity indicating the briquettes were properly heated. The heat was then purified and worked in the usual manner which forms no part of the present invention.

Not only does substitution of these briquettes of partially reduced iron oxide for the usual iron ore reduce the heating period which in turn decreases the time required to produce a heat which is a primary consideration, but inferior grades of ore or other iron oxide material may be used to produce the briquettes. Briquetting reduces the difficulties encountered with fine ores. Furthermore, these briquettes of partially reduced iron oxide are somewhat more economical to produce than sponge iron as reduction has not been carried to completion with its additional costs.

I claim:

1. In the method of operating an open hearth furnace in accordance with the high hot metal process, the steps of charging a plurality of bodies of partially reduced iron oxide into the furnace, each of said bodies having a core of iron oxide and an outer layer of sponge iron; heating these charged bodies and oxidizing the sponge iron; and then charging molten pig iron into the furnace.

2. In the method of operating an open hearth furnace in accordance with the high hot metal process, the steps of charging a plurality of bodies of partially reduced iron ore into the furnace as part of the initial charge, each of said bodies having an outer portion of sponge iron and a core portion of iron oxide and having from 5% to 60% of the total iron as metallic iron; heating these bodies and oxidizing the sponge iron to iron oxide; and then charging molten pig iron into the furnace whereby the iron oxide of the core portions and the outer portions reacts with the molten pig iron.

3. In the method of operating an open hearth furnace in accordance with the high hot metal process, the steps of charging limestone into the furnace; charging a plurality of bodies of partially reduced iron oxide into the furnace above the limestone, each of said bodies having a core of iron oxide and an outer layer of sponge iron, the sponge iron of each body constituting from 5% to 60% by weight of the total iron in the body, heating these charged materials and oxidizing the sponge iron; and then charging molten pig iron into the furnace, removing slag from the furnace, and purifying and working the heat.

CLARENCE L. ALTENBURGER.

REFERENCES CITED

The following references are of record in the file of this patent:

UNITED STATES PATENTS

| Number | Name | Date |
|---|---|---|
| 864,972 | Lash | Sept. 3, 1907 |
| 2,131,006 | Dean | Sept. 20, 1938 |
| 2,331,074 | Jones | Oct. 5, 1943 |
| 2,386,073 | Stewart | Oct. 2, 1945 |

FOREIGN PATENTS

| Number | Country | Date |
|---|---|---|
| 5,568 | Great Britain | 1893 |